(12) United States Patent
Yoshida et al.

(10) Patent No.: US 7,484,636 B2
(45) Date of Patent: Feb. 3, 2009

(54) FUEL CAP WITH HIGH SEALING PROPERTIES

(75) Inventors: Hiromitsu Yoshida, Soja (JP); Takami Ono, Soja (JP)

(73) Assignee: Asteer Co., Ltd., Okayama (JP)

( * ) Notice: Subject to any disclaimer, the term of this patent is extended or adjusted under 35 U.S.C. 154(b) by 784 days.

(21) Appl. No.: 10/988,935

(22) Filed: Nov. 15, 2004

(65) Prior Publication Data
US 2005/0121454 A1   Jun. 9, 2005

(30) Foreign Application Priority Data
Dec. 4, 2003 (JP) ............................. 2003-405832

(51) Int. Cl.
B65D 53/00 (2006.01)
B65D 41/06 (2006.01)
B65D 51/16 (2006.01)

(52) U.S. Cl. .................. 220/304; 220/293; 220/303; 220/DIG. 33; 277/647

(58) Field of Classification Search ............. 220/293, 220/304, 86.1, 86.2, DIG. 32, DIG. 33, 303; 277/647
See application file for complete search history.

(56) References Cited

U.S. PATENT DOCUMENTS

| | | | | | |
|---|---|---|---|---|---|
| 2,327,293 | A | * | 8/1943 | Twyman ...................... | 277/638 |
| 3,595,588 | A | * | 7/1971 | Rode ........................... | 277/650 |
| 4,360,122 | A | * | 11/1982 | Sullivan ...................... | 220/295 |
| 4,436,219 | A | * | 3/1984 | Reutter ........................ | 220/295 |
| 4,785,961 | A | * | 11/1988 | Kasugai et al. ............. | 220/203.25 |
| 4,787,528 | A | * | 11/1988 | Harris et al. ................ | 220/86.2 |
| 4,887,733 | A | * | 12/1989 | Harris ......................... | 220/203.06 |
| 5,020,685 | A | * | 6/1991 | Sato et al. ................... | 220/203.21 |
| 5,108,001 | A | * | 4/1992 | Harris ......................... | 220/203.06 |
| 5,110,003 | A | * | 5/1992 | MacWilliams .............. | 220/304 |
| 5,183,173 | A | * | 2/1993 | Heckman ................... | 220/203.07 |
| 5,234,122 | A | * | 8/1993 | Cherng ....................... | 220/211 |
| 5,238,136 | A | * | 8/1993 | Kasugai et al. .............. | 220/304 |
| 5,381,919 | A | * | 1/1995 | Griffin et al. ................ | 220/326 |
| 5,395,004 | A | * | 3/1995 | Griffin et al. ................ | 220/295 |
| 5,435,358 | A | * | 7/1995 | Kempka et al. ............. | 141/312 |
| 5,467,621 | A | * | 11/1995 | Gravino ...................... | 70/171 |

(Continued)

FOREIGN PATENT DOCUMENTS

JP   6-040262   2/1994

(Continued)

*Primary Examiner*—Anthony D Stashick
*Assistant Examiner*—Ned A Walker
(74) *Attorney, Agent, or Firm*—William L. Androlia; H. Henry Koda

(57) ABSTRACT

A fuel cap comprising a closure unit adapted to be fitted into an opening of a filler neck having ridges formed on its inner side face intermittently in the circumferential direction, so that it may be secured to the filler neck by engaging with the ridges during a turning operation. The closure unit includes a closure body, a seal ring, a turning control sleeve, a sliding sleeve, a base and a coil spring. The amount of the spacing formed between the lower end of the sliding sleeve and the base is set smaller than an amount of the downward sliding of the sliding sleeve, which is caused when the engagement protrusions formed on the outer side face of the sliding sleeve slip into lower face of the ridges formed on the inner side face of the filler neck.

8 Claims, 9 Drawing Sheets

U.S. PATENT DOCUMENTS

| | | | | |
|---|---|---|---|---|
| 5,480,055 | A * | 1/1996 | Harris et al. | 220/203.26 |
| 5,509,569 | A * | 4/1996 | Hiranuma et al. | 220/746 |
| 5,529,201 | A * | 6/1996 | Tallent et al. | 220/298 |
| 5,540,347 | A * | 7/1996 | Griffin | 220/203.23 |
| 5,615,793 | A * | 4/1997 | Muller | 220/295 |
| 5,791,507 | A * | 8/1998 | Harris et al. | 220/203.26 |
| 5,794,806 | A * | 8/1998 | Harris et al. | 220/203.26 |
| 5,829,620 | A * | 11/1998 | Harris et al. | 220/203.26 |
| 5,904,057 | A * | 5/1999 | Abney et al. | 70/167 |
| 6,095,363 | A * | 8/2000 | Harris et al. | 220/203.26 |
| RE36,927 | E * | 10/2000 | Griffin et al. | 220/326 |
| 6,173,855 | B1 * | 1/2001 | Stark | 220/295 |
| 6,179,148 | B1 * | 1/2001 | Harris | 220/288 |
| 6,209,745 | B1 * | 4/2001 | Jansson | 220/288 |
| 6,209,746 | B1 * | 4/2001 | Gerdes | 220/288 |
| 6,213,331 | B1 * | 4/2001 | Morgan et al. | 220/295 |
| 6,223,923 | B1 * | 5/2001 | Fishman | 220/210 |
| 6,230,918 | B1 * | 5/2001 | Huynh et al. | 220/300 |
| 6,286,704 | B1 * | 9/2001 | Harris | 220/304 |
| 6,325,233 | B1 * | 12/2001 | Harris | 220/288 |
| 6,325,240 | B1 * | 12/2001 | Gruber | 220/835 |
| 6,446,826 | B1 * | 9/2002 | Foltz et al. | 220/86.2 |
| 6,648,160 | B2 * | 11/2003 | Hotch | 220/255 |
| 6,705,483 | B2 * | 3/2004 | Hagano et al. | 220/303 |
| 6,745,914 | B2 * | 6/2004 | Hagano et al. | 220/288 |
| 6,763,966 | B2 * | 7/2004 | Harris | 220/293 |
| 6,997,339 | B2 * | 2/2006 | Ueki | 220/293 |
| 7,147,018 | B2 * | 12/2006 | Krach et al. | 141/301 |
| 7,281,639 | B2 * | 10/2007 | Yoshida et al. | 220/304 |
| 2002/0066734 | A1 * | 6/2002 | Harris | 220/304 |
| 2002/0074335 | A1 * | 6/2002 | Ono et al. | 220/304 |
| 2002/0088801 | A1 * | 7/2002 | Temmesfeld | 220/86.2 |
| 2004/0000553 | A1 * | 1/2004 | Ueki | 220/293 |
| 2007/0210086 | A1 * | 9/2007 | Behnamrad et al. | 220/303 |

FOREIGN PATENT DOCUMENTS

| | | |
|---|---|---|
| JP | 2712115 | 2/1998 |
| JP | 2001-341537 | 12/2001 |

* cited by examiner

FUEL CAP WITH HIGH SEALING PROPERTIES

TECHNICAL FIELD

The present invention relates to a fuel cap for the fuel tank of an automobile or the like.

BACKGROUND OF THE INVENTION

A fuel cap to be used in the automobile or the like has to provide a god seal when it is completely secured, although it is just a simple part. The fuel cap is also required to enhance the operability from the early stage of the securing operation where the turning operation is started to the end stage of the securing operation where the turning operation is completed, for example, to reduce the turning amount of the opening/closing operation.

The conventional fuel caps describing those purposes are exemplified by Japanese Patent No. 2712115, JP-A-06-040262 or JP-A-2001-341537.

Japanese Patent No. 2712115 has proposed a cap, which is constructed to include a core corresponding to the closure body of the invention, and a sleeve. In this cap of Japanese Patent No. 2712115, the sleeve is made movable relative to the core and supports a seal ring. As a result, the cap is provided with closing means for closing the opening of a liquid filling port, and grasping means for grasping the liquid filling port to compress the seal ring between the sleeve and the liquid filling port.

JP-A-06-040262 has proposed a closure for a filler pipe of a tank. This closure comprises: a gasket to engage with a flange at one end portion of a filler pipe; a cap stem having a central portion made to extend into the filler pipe; a clamp ring for carrying a pair of clamp lugs adapted to engage with lower part of the flange formed at one end portion of the filler pipe; springs for pushing the clamp lugs to be engaged with the flange; a cam for keeping the clamp lugs out of engagement with the flange; and connection means for connecting the stem to the clamp ring so that the stem and the clamp ring may simultaneously move in angular directions.

JP-A-2001-341537 has proposed a fuel filling device for a fuel tank, which comprises: a casing body removably mounted on a fuel filling pipe; an operation unit for operating to open/close a fuel passage; seal means interposed between the casing body and a face of the fuel filling pipe; a spring arranged to bias the seal means towards the face; and cam means converting rotation of the device into a sealing force by which the seal means pushes the sheet face.

For example, Japanese Patent No. 2712115 has adopted a structure, in which the opening/closing operation of the fuel cap is completed by a turning operation of 45 degrees. However, it is difficult to obtain a space capable of pressing the seal ring tightly with only an amount of downward sliding by fastening of such a cap. Therefore, the fuel cap described in Japanese Patent No. 2712115 has a structure, in which the seal ring is pressed to the opening edge of the filler neck by a spring. Similarly, the fuel caps described in JP-A-06-040262 and JP-A-2001-341537 adopt the similar structure.

In this structure, in order to obtain a space to press the seal ring tightly, these conventional fuel caps also adopt the construction in which the spring elastically supports a sleeve for pressing the seal ring tightly. With only this construction, however, the seal ring pressed tightly may be fluctuated as a result of a load from the outside of the fuel cap or by the pressure of fuel vapor coming from the inside of the filler neck, thereby to deteriorate the sealing property. In case the fuel cap being inclined is fitted to the filler neck, moreover, it causes deterioration of the sealing property by which the pressure of the seal ring easily becomes insufficient where the spring may be further compressed. This is because the conventional fuel cap has been designed based upon the assumption that the cap is in a normal position.

SUMMARY OF THE INVENTION

From the viewpoint of improving the opening/closing operation of the fuel cap, it is invaluable to suppress the turning amount of the fuel cap. However, it is still insufficient to solve the aforementioned reduction in the sealing property. Therefore, the present inventors have investigated to develop a fuel cap which will not allow such a reduction in the sealing property as might otherwise be caused by the load from the outside of the fuel cap, the pressure of the fuel vapor coming from the inside of the filler neck or the twisted installation of the fuel cap, while keeping a high operability by adopting a pressing structure of the seal ring utilizing a elastic member.

As a result of the investigations, the present inventors have developed a fuel cap comprising a closure unit adapted to be fitted into an opening of a filler neck having a plurality of ridges formed on its inner side face intermittently in the circumferential direction, so that it may be secured to the filler neck by engaging with the ridges while turning, wherein the closure unit includes a closure body, a seal ring, a sleeve, a base and an elastic member, the closure body includes a trunk portion extending from a head portion to be turned and having a plurality of closure side fitting portions on its outer side face, the sleeve is provided on its inner side face with a plurality of sleeve side fitting portions and an elastic member fitting portion and on its outer side face with a plurality of engagement protrusions adapted to be passed axially through the ridges of the filler neck and turned for engaging upward with the ridges, the sleeve can be freely slided upward and downward with respect to the trunk portion of the closure body while being fitted together with the seal ring on the trunk portion and can be freely turned integrally with the closure body by fitting the closure side fitting portion and the sleeve side fitting portion, a spacing is formed between a lower end of the sleeve and the base by integrally joining the base and a lower end of the trunk portion fitted the sleeve thereon while sandwiching the elastic member between the elastic member fitting portion of the sleeve and the base, and an amount of the spacing is set smaller than an amount of the downward sliding of the sleeve which is caused when the engagement protrusions formed on the outer side face of the sleeve slip into the lower faces of the ridges formed on the inner side face of the filler neck.

In the fuel cap of the invention, the amount of the spacing formed between the lower end of the sleeve and the base is set smaller than the amount of the downward sliding of the sleeve, which is caused when the engagement protrusions slip into lower face of the ridges of the filler neck. As a result, the sleeve moving downwardly during the turning operation in the closing direction abuts against the base in the course of slipping into lower face of the ridges. The remaining of the total amount of the downward sliding of the sleeve is consumed by the sleeve pushing down the base, to thereby push down the head portion of the closure body integrated with the base. As a result, the seal ring is sandwiched and pressed tightly by the head portion and the opening edge of the filler neck. According to this structure, the ridges formed on the inner side face of the filler neck and the base hold the sleeve therebetween and to thereby keep position of the fuel cap stable when the fuel cap in the invention is completely secured. This means that the stable sealing by pressure of the seal ring is ensured. As a result, the high sealing property can be kept even if the load from the outside of the fuel cap or the pressure of the fuel vapor coming from the inside of the filler neck varies or the twisted installation of the fuel cap.

Here, in case the lower end of the sleeve and the base are spaced by some cause while the fuel cap is secured, the sleeve is not allowed to move upward because the engagement protrusions and the ridges engage with each other, but the base can only be allowed to move downward relative to the sleeve. This permits the head portion of the closure body to move downward with movement of the base. According to this structure, therefore, the seal ring may be further pressed tightly, but the sealing by pressure of the seal ring is neither weakened nor released unexpectedly.

The fuel cap in the invention is constructed to carry out the sealing property by pressing the seal ring tightly with the head portion of the closure body and the opening edge of the filler neck. It is, therefore, preferable to mount and fix the seal ring in advance on the root of the trunk portion of the closure body. Therefore, the construction of the closure body may include a ring mounting portion at the root of the trunk portion with respect to the head portion, and the seal ring mounted on the ring mounting portion may be sandwiched and pressed tightly by the head portion and the opening edge of the filler neck. As the shape of the seal ring capable of pressing the seal ring sufficiently by clamping it between the head portion of the closure body and the opening edge of the filler neck, the seal ring may be formed into an annular shape having a C-shaped section with a spacing formed by individual edges of an upper circumferential portion and a lower circumferential portion. In this case, the seal ring is pressed tightly by being accessed mutually the edges of the upper circumferential portion in facial contact with the head portion of the closure body and the lower circumferential portion in contact with the opening edge of the filler neck.

The fuel cap in the present invention can complete the turning operation of the closure unit within the turning range, in which the engagement protrusions formed on the outer side face of the sleeve are kept in engagement with the ridges formed on the inner side face of the filler neck. In other words, the engagement protrusions come off from engagement with the ridges, if the closure unit is turned over the aforementioned turning range. In order to improve the turning operability of the closure unit, therefore, the sleeve of the fuel cap in the present invention may be divided into a sliding sleeve turning with the closure body and a turning control sleeve fixed in position with respect to the filler neck and fitted on the sliding sleeve. The sliding sleeve is provided on its inner side face with the sleeve side fitting portions and an elastic member fitting portion and on its outer side face with engagement protrusions adapted to be passed axially through corresponding intervals formed between the ridges of the filler neck and then turned for engaging upward with the ridges, and guide grooves extending in the circumferential direction and set to have its length corresponding to a desired turning amount of the disclosure. On the other hand, the turning control sleeve includes engagement members extending therefrom and adapted to be engaged with fitting to corresponding intervals formed between the ridges of the filler neck, and engagement protruding parts protruding in radially inward direction formed on its inner side face. Moreover, the engagement protruding parts of the turning control sleeve are applied to the guide grooves of the sliding sleeve, to limit the range in which the engagement protruding parts are allowed to move in the circumferential direction, thereby to control the turning amount of the closure unit in the turning operation.

According to the fuel cap in the invention, therefore, the sleeve having the engagement parts slipping into lower face of the ridges pushes down the base so that the head portion of the closure body integrally fitted with the base can press the seal ring tightly with the opening edge of the filler neck, and thereby to obtain the sealing property. Moreover, the turning operation in the closing direction can be completed securing within the minimum necessary turning amount. For similar actions or effects, the structure may also be modified such that guide grooves are formed in the inner side face of the turning control sleeve and such that the engagement protruding parts protruding in radially outward direction are formed on the outer side face of the sliding sleeve.

Moreover, the fuel cap is preferably provided with a mechanism for comfortableness of the turning operation, i.e., the construction capable of sensing the end of the turning operation in the opening/closing direction thereof. Of these, the comfortableness mechanism for enabling an operator to sense the end of the turning operation in the closing operation has an action to prevent the fuel cap from being broken, as might otherwise be caused by an excessive turning operation. In the sleeve of the fuel cap in the present invention, therefore, the engagement protruding parts of the turning control sleeve may be replaced by latches having protrusions protruding in radially inward direction formed on the inner side face of the turning control sleeve, and the guide grooves may include bumps formed in a vicinity of at least one end of the guide groove of the sliding sleeve. This construction can provide not only a function to control the turning amount in minimum necessary range in the turning operation of the closure unit but also a function to provide comfortableness in the turning operation of the closure unit as a result that the protrusions of the latches run over the bumps.

Here, the aforementioned phrase of "vicinity of at least one end of the guide groove" means an area around each end of the guiding groove, i.e., a position where a bump is formed at which a protrusion of the latch runs over the bump is capable of being fitted between the end of the guiding groove and the bump. The construction for providing comfortableness can also swap the positional relationship between the latches and the guide grooves, i.e., the guide grooves may be formed in the inner side face of the turning control sleeve, and the latches having the protrusions protruding in the radially outward direction may also be formed on the outer side face of the sliding sleeve.

The elastic member to be used in the fuel cap of the invention may also be constructed to push down the base on the basis of the sleeve in the completely secured condition while elastically supporting the sleeve with respect to the base. This construction may be exemplified by sandwiching a plate spring as the elastic member between the elastic member fitting portion of the sleeve and the base. In the simplest example, the elastic member is exemplified by a coil spring being loosely fitted to the trunk portion of the closure body. This coil spring is advantageous in that it can be easily fitted loosely on the trunk portion of the closure body thereby to facilitate the assembly.

The fuel cap in the present invention can be completed its opening/closing operation within the turning range in which the engagement protrusions formed on the outer side face of the sleeve or the sliding sleeve begin to slip into lower face of the ridges formed on the inner side face of the filler neck until completely engaged with the ridges, thereby to improve the opening/closing operability. Moreover, even in the secured conditions while loading from the outside of the fuel cap, pressurizing of the fuel vapor coming from the inside of the filler neck or being the fuel cap installed in twisted condition, the fuel cap in the present invention can be achieved a sufficient and stable sealing property by the construction in which the lower end of the sleeve or the lower end of the sliding sleeve and the base are in abutment against each other so that the closure unit hardly rattles as a whole. Thus, the present invention has a result of providing a fuel cap with improvements in the opening/closing operability and in the performance to prevent reduction of the sealing property.

DETAILED DESCRIPTION OF THE INVENTION

An embodiment of the invention will be described with reference to the accompanying drawings.

Figure 1:
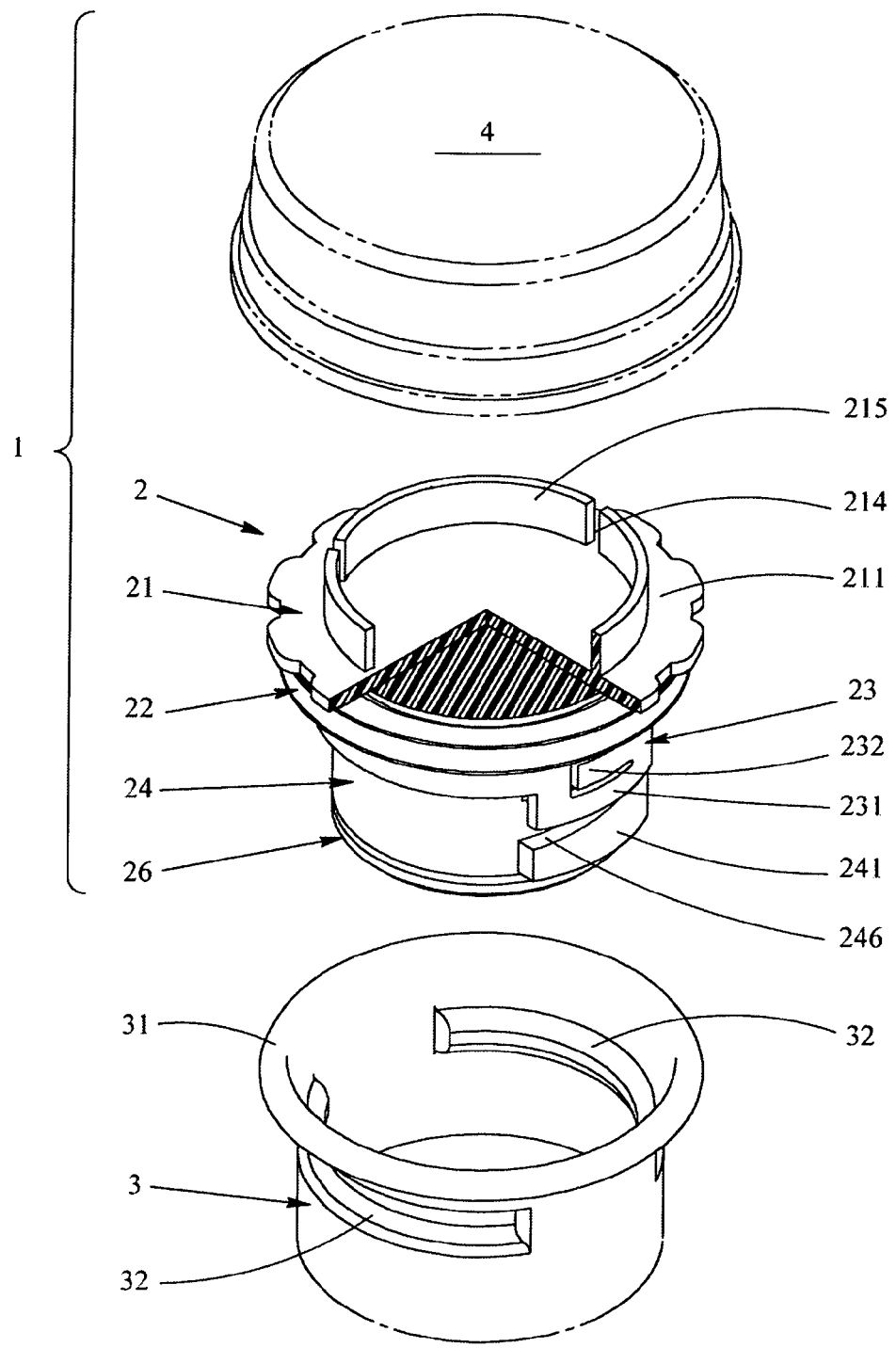
FIG. 1 is a partially broken perspective view showing one embodiment of a fuel cap of the present invention.

A fuel cap 1 of this embodiment is constructed, as shown in FIG. 1, by covering the head portion 211 of a closure body 21 forming a closure unit 2 with a handle 4. This handle 4 is a member for facilitating the turning operation of the fuel cap 1, and the closure unit 2 of the fuel cap 1 substantially acts as a member for closing a filler neck 3. This filler neck 3 is provided with: an opening edge 31 formed by utilizing a curling processing with folding back an end portion of a metallic pipe in radially outward direction; and a pair of ridges 32 and 32 extending in the circumferential direction formed in the inner side face thereof by utilizing a press working. In the fuel cap 1 of the present invention, each length of the ridges 32 may extend within a turning range necessary for the opening/closing operation. Therefore, the ridges may be as short as the turning range or may be a plurality of the aforementioned short ridges being placed intermittently. The interval formed between the ridges 32 and 32 is equal to either the width of an engagement member 231 of a turning control sleeve 23 describing later or the width of engagement protrusions 241 formed on the outer side face of a sliding sleeve 24.

Figure 2:
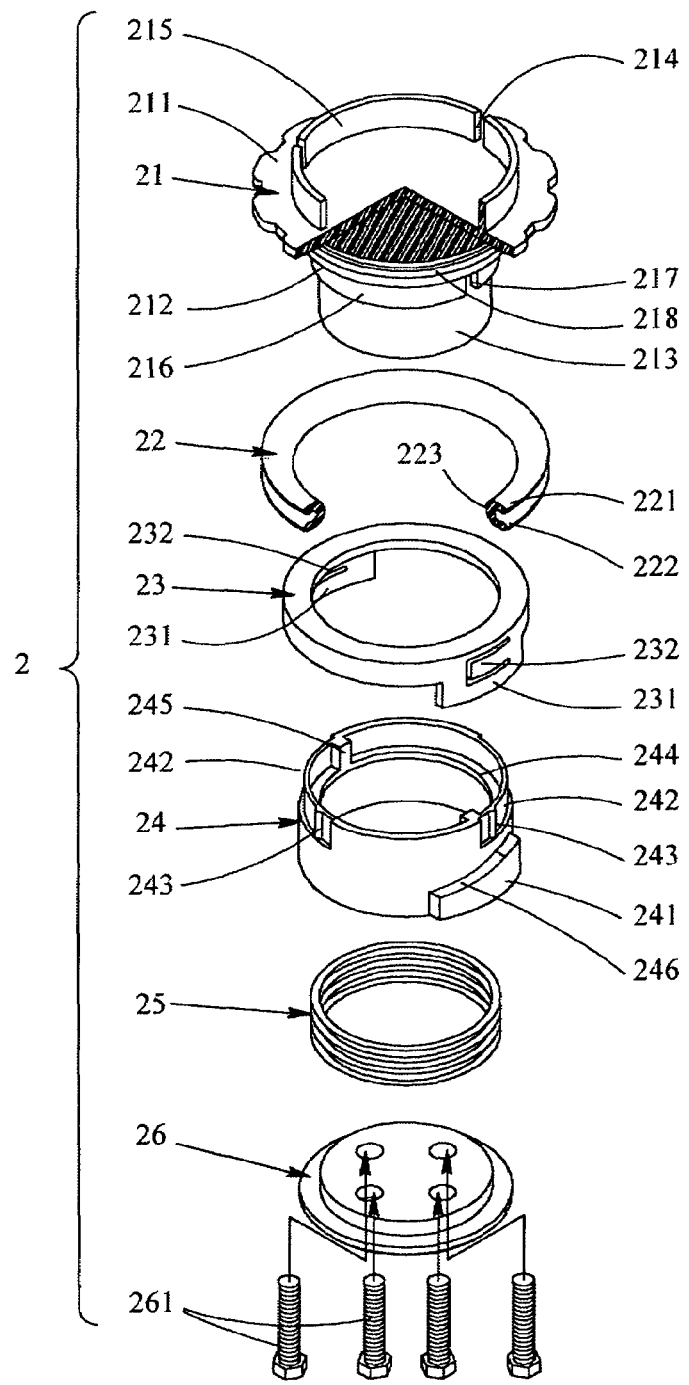
FIG. 2 is an exploded perspective view showing a construction of a closure unit of the fuel cap.

As shown in FIG. 2, the closure unit 2 is constructed to include the closure body 21, a seal ring 22, the turning control sleeve 23, the sliding sleeve 24, a coil spring 25 and a base 26 vertically in recited order from the top. The seal ring 22 can also be separately mounted on a ring mounting portion 212 even after the assembly of other members is completed. The remaining members except the seal ring are integrated by that the turning control sleeve 23, the sliding sleeve 24 and the coil spring 25 are mounted in order on the trunk portion 213 of the closure body 21 and finally fixed the base 26 to the trunk portion 213. In the fuel cap 1 of this embodiment, fixation of the base 26 to the lower end of the trunk portion 213 of the closure body 21 is carried out by means of bolts 261. Of course, the other well-known conventional methods or means for fixing the base 26 may also be applicable.

Figure 5:
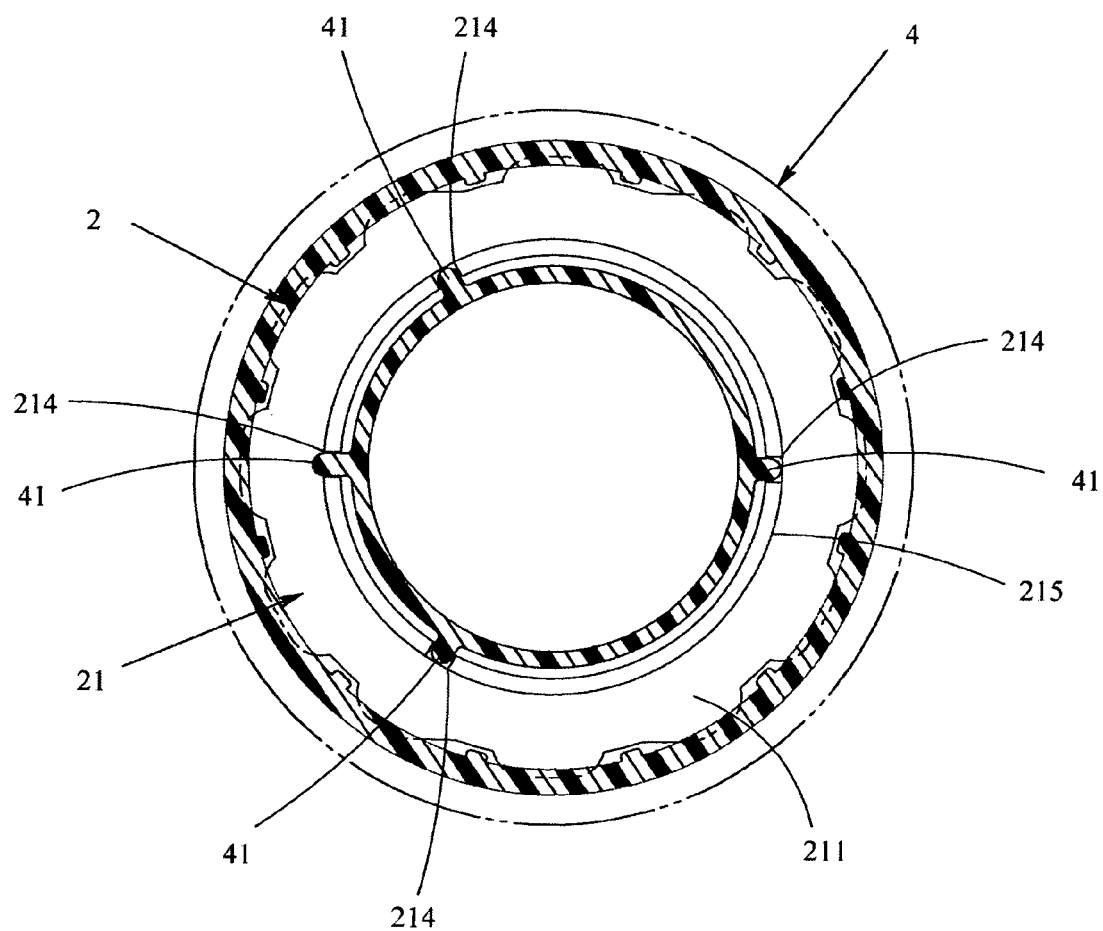
FIG. 5 is a section taken on line A-A in FIG. 3.

The closure body 21 is a resin product molded integrally having a structure, in which the cylindrical trunk portion 213 coaxially droops from the head portion 211 having a flat and approximately disc-like shape. The closure body 21 of this embodiment, as shown in FIG. 1 and FIG. 5, includes the head portion 211 having a peripheral edge formed into an undulating shape for engaging with the inner face of the handle 4 and a circumferential wall 215 formed on the upper face of the head portion 211 having notches 214 for engaging with positioning protrusions 41 of the handle 4. As a result, the handle 4 can be easily positioned by engaging the predetermined positioning protrusions 41 with the notches 214 of the circumferential wall 215, and thereby to simplify the assembly between the closure unit 2 and the handle 4. In the turning operation with the handle 4, moreover, engagement with the inner face of the handle 4 and the peripheral edge of the head portion 211 can prevent its idle turn. The trunk portion 213 is provided with: a belt portion 216 having a diameter larger than that of the trunk portion formed at right below the ring mounting portion 212; and closure side fitting portions 217 which are recessed portions formed on the belt portion 216.

Figure 3:
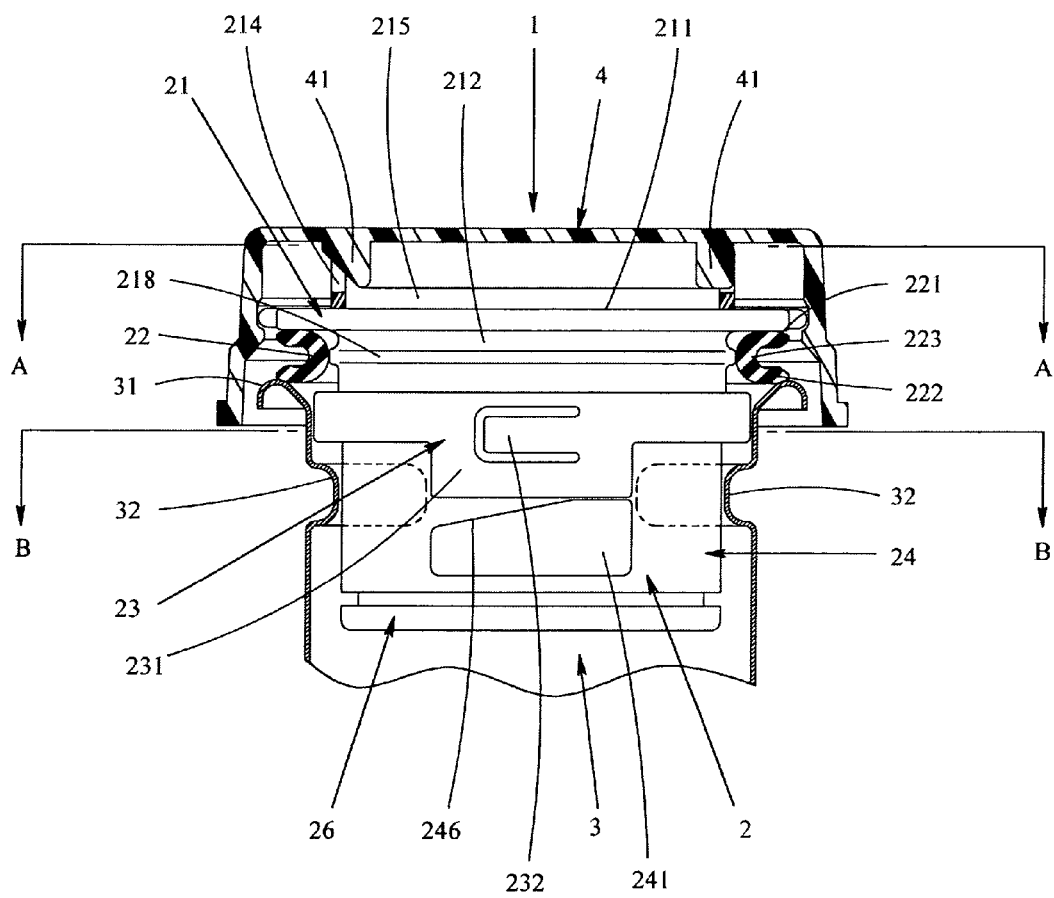
FIG. 3 is a sectional view of the vicinity of an opening of a filler neck showing the early stage of the securing operation right after the fuel cap was fitted in the filler neck.

As shown in FIG. 2 and FIG. 3, the seal ring 22 is mounted on the ring mounting portion 212 formed at the root of the trunk portion 213 with respect to the head portion 211 of the closure body 21. The seal ring 22 of this embodiment is an annular rubber elastic body having a C-shaped section, in which the upper circumferential portion 221 and the lower circumferential portion 222 have their end edges spaced from each other. This seal ring 22 is pressed tightly by being accessed mutually the edges of the upper circumferential portion 221 in facial contact with the head portion 211 of the closure body 21 and the lower circumferential portion 222 in facial contact with the opening edge 31 of the filler neck. Here, the ring mounting portion 212 is required to perform for preventing occurrence of recess in radially inward direction at an intermediate circumferential portion 223 integrally joining the upper circumferential portion 221 and the lower circumferential portion 222 of the seal ring 22 so as to guide deformation of the seal ring 22 smoothly while being pressed. Therefore, the ring mounting portion 212 may be constructed integrally with a ring mounting ridge 218 protruding radially to abut against the intermediate circumferential portion 223 of the seal ring. The inner diameter of the seal ring 22 may be set slightly smaller than that of the outer diameter of the ring mounting ridge 218 of the ring mounting portion 212, so that the seal ring 22 can be stable in mounting on the ring mounting ridge 218 by own restoring force.

In order to obtain comfortableness enabling to have sense of the each stage where the securing operation with turning the fuel cap is started/completed while limiting the turning range of the fuel cap, the fuel cap 1 of this embodiment is constructed by the turning control sleeve 23 having latches 232 and the sliding sleeve 24 having guide grooves 242 for running the latches 232 in sliding contact thereon. As shown in FIG. 2 and FIG. 3, the turning control sleeve 23 of this embodiment is an annular member made of resin molded integrally having an outer diameter substantially equal to the inner diameter of the filler neck 3, and is mounted on the upper end of the sliding sleeve 24. This turning control sleeve 23 is provided with the engagement members 231 and 231 drooping along the outer side face thereof, and the latches 232 having protrusions 233 protruding in radially inward direction formed integrally by cutting partially the wall face of the turning control sleeve. The latches 232 have not only an action to limit the turning range of the sliding sleeve 24 by bringing the protrusions thereof into sliding engagement with the guide grooves 242 of the sliding sleeve 24, as will be described hereinafter, but also an action to provide comfortableness of the turning operation in which the protrusions of the latches 232 run over the bumps 243 and 243 formed to vicinity of at least one end of the guide grooves 242. Therefore, the latches 232 are preferable to have a moderate elasticity. In this case, it is conceivable to form separate latches of plate springs on the inner wall face of the turning control sleeve 23. From the viewpoint of reducing the number of parts and simplifying the assembly, however, it is preferable that the latches having a plate spring shape is formed by cutting the wall face of the turning control sleeve 23 long in the circumferential direction, as in this embodiment.

Figure 4:
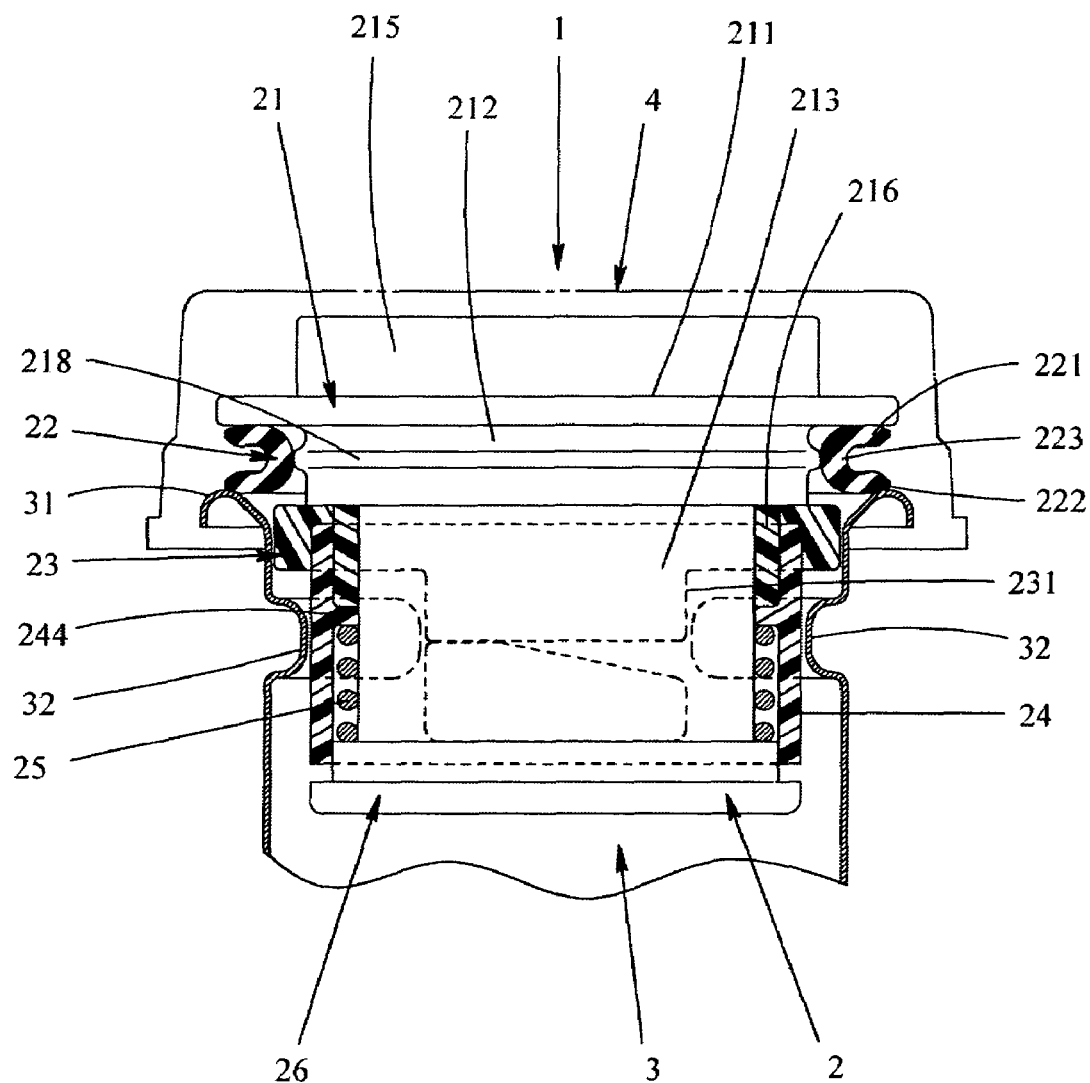
FIG. 4 is a sectional view of the closure unit showing the early stage of the securing operation as mentioned above.

As shown in FIG. 2 and FIG. 4, the sliding sleeve 24 is provided on its inner face with an elastic member fitting portion 244 having a horizontal circumference thereby to form sleeve side fitting portions 245 which have ridges protruding upward from that elastic member fitting portion 244. These sleeve side fitting portions 245 fit with the closure side fitting portions 217 formed at the trunk portion 213 of the closure body 21, thereby to turn the closure body 21 and the sliding sleeve 24 integrally. On the outer side face of the sliding sleeve 24, moreover, there are formed the engagement protrusions 241 adapted to be passed axially through the corresponding intervals formed between the ridges 32 and 32 of the filler neck 3 and then turned for engaging upward with the ridges 32. The engagement protrusions 241 of this embodiment, as referred to FIG. 3, are formed into such an approximately trapezoidal shape in the front view having a slant with downward pitch in the aforementioned closing direction so that the engagement protrusions may slip into lower faces of the ridges 32 and engage upward with the ridges 32 at the end stage where the securing operation of the cap is completed while the turning operation in closing direction. The engagement protrusions 241 in the fuel cap 1 of the invention have not only the original function to secure the closure unit 2, i.e., the fuel cap 1, with the filler neck 3 but also the function to carry out a stable sealing property. This sealing property is obtained by pressing the seal ring 22 tightly toward the opening edge 31 of the filler neck with the relatively lowered head portion 211 by the closure body 21 integrated to the base 26 slipping into the lower face of the ridges 32 of the filler neck 3 together with the sliding sleeve 24 having the lower end abutting against the base 26. On the other hand, the sliding sleeve 24 is provided in its outer side face with the guide grooves 242 extending in the circumferential direction. These guide grooves 242 have functions to limit the turning range of the entire closure unit 2 and to provide comfortableness of the turning operation by correlation with the latches 232 of the turning control sleeve 23.

The closure unit 2 of this embodiment employs the coil spring 25 as the elastic member for elastically supporting the sliding sleeve 24 with respect to the base 26. This coil spring 25 is advantageous in that it can be easily mounted loosely on the trunk portion 213 of the closure body 21. In this embodiment, to be continued from the turning control sleeve 23 and the sliding sleeve 24 which are sequentially mounted on the trunk portion 213 of the closure body 21, the coil spring 25 is brought at its upper end into facial contact with the elastic member fitting portion 244 of the sliding sleeve 24, and the base 26 is finally fixed on the lower end of the trunk portion 213. As a result, the sliding sleeve 24 elastically supported to the base 26 is constructed. At this time, an amount of spacing as a predetermined distance between the lower end of the sliding sleeve 24 and the base 26 is established in the normal state of the fuel cap 1.

In the fuel cap 1 of the present invention, the lower end of the sliding sleeve 24 lowered by slopping the engagement protrusions 241 thereof into the lower face of the ridges 32 comes into abutment against the base 26 on halfway of its downward movement. Then, the closure body 21 integrated with the base 26 is pushed further downward so that the seal ring 22 is sandwiched and pressed tightly between the head portion 211 of the closure body 21 and the opening edge 31 of the filler neck. Thus, the description of the above can be expressed in the following relation:

Amount of Downward Sliding of the Sliding Sleeve= (Amount of Spacing between Lower End of the Sliding Sleeve and the Base)+(Pressed Allowance of the Seal Ring)

An amount of the downward sliding of the sliding sleeve 24 is determined by the positional relation between the engagement protrusions 241 of the sliding sleeve 24 and the ridges 32 at the early stage of the securing operation, in which the fuel cap 1 is just fitted in the filler neck 3. In this embodiment, the amount of the downward sliding is the distance at the early stage of the securing operation between the horizontal upper faces of the engagement protrusions 241 and the lower faces of the ridges 32, as shown in FIG. 3. The amount of the spacing between the lower end of the sliding sleeve 24 and the base 26 is determined by the state set in which the sliding sleeve 24 is elastically supported to the base 26. In this embodiment, as shown in FIG. 4, the sliding sleeve 24 is pushed down in the thickness of the turning control sleeve 23 which is sandwiched between the head portion 211 of the closure body 21 and the sliding sleeve 24. As a result, the amount of the spacing is influenced by the thickness of the turning control sleeve 23. The pressed allowance of the seal ring 22 is determined by subtracting the amount of the spacing between the lower end of the sliding sleeve 24 and the base 26 from the amount of the downward sliding of the sliding sleeve 24. In case the pressed allowance is desired to increase, therefore, it can be achieved either by increasing the amount of the downward sliding of the sliding sleeve 24 or by reducing the amount the spacing between the lower end of the sliding sleeve 24 and the base 26.

Figure 7:
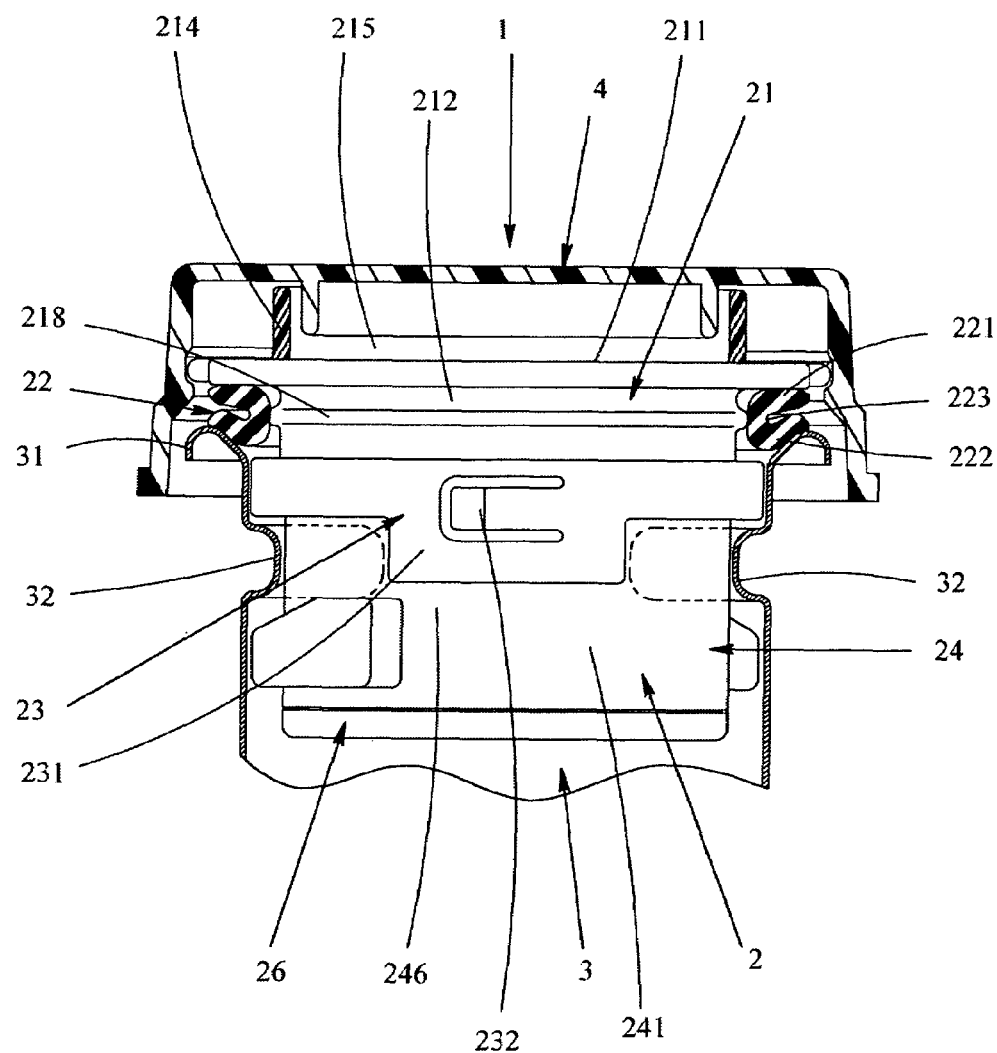
FIG. 7 is a sectional view of the vicinity of the opening of the filler neck showing the end stage of the securing operation right after the turning operation of fuel cap was completed.
Figure 8:
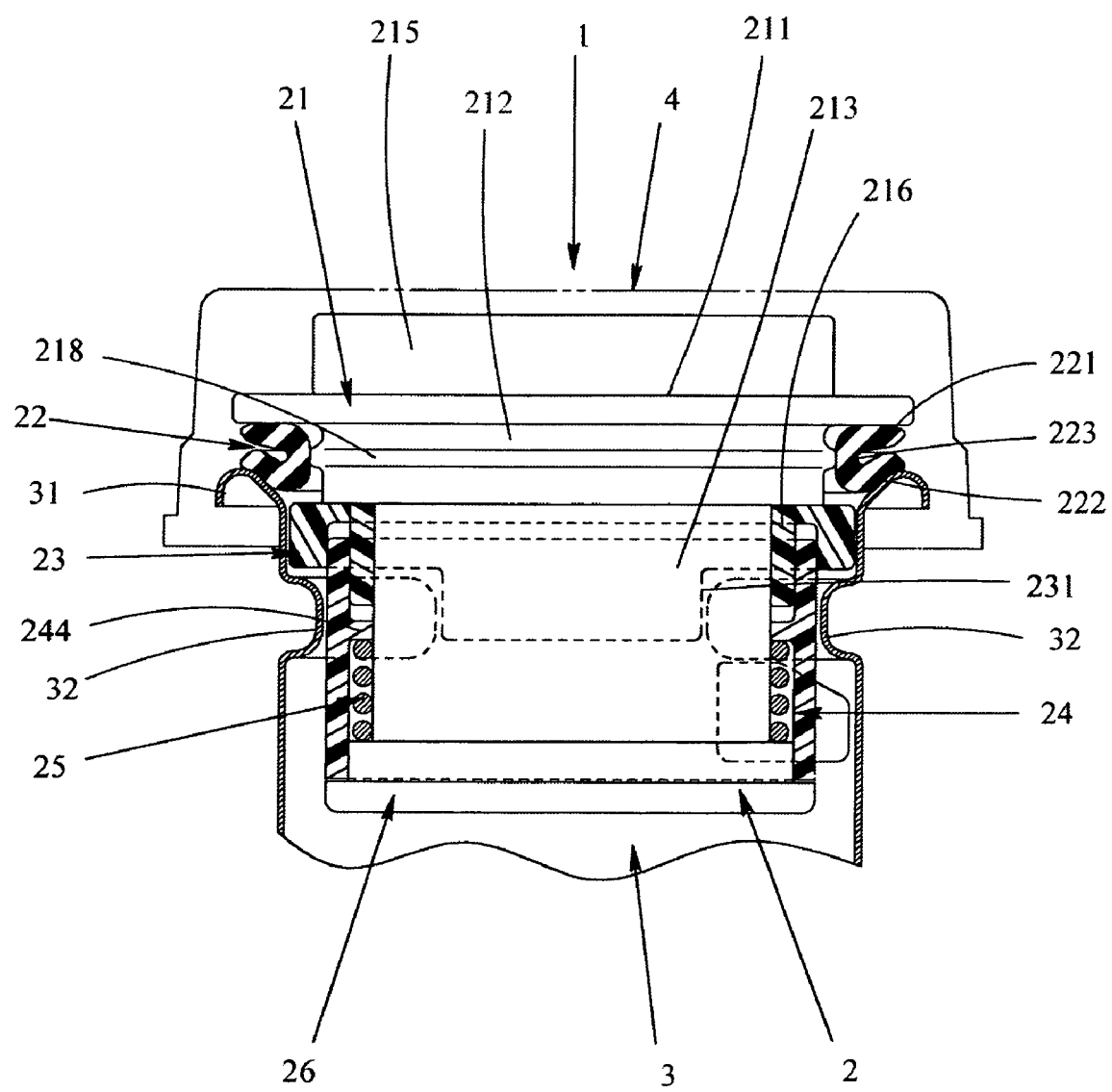
FIG. 8 is a sectional view of the closure unit showing the end stage of the securing operation as mentioned above.

The fuel cap 1 of the present invention is characterized in that the lower end of the sliding sleeve 24 and the base 26 are made to abut against each other at the position be secured with the filler neck thereby to prevent an excessive compression of the coil spring 25, as shown in FIG. 7 and FIG. 8, so as to avoid deterioration of the sealing property due to the rattling of the closure unit 2 at the end stage of the securing operation. At this end stage, the base 26 becomes to be elastically supported with respect to the sliding sleeve 24, contrary to that the sliding sleeve 24 has been elastically supported with respect to the base 26 before entering the end stage. As a result, the moving direction of the base 26 is controlled to the downward direction even while rattling of the closure body 21. Moreover, the base 26 is elastically supported downward at all times with respect to the sliding sleeve 24. Therefore, the base 26 moves exclusively in the direction to further press the seal ring 22 tightly so that the sealing property is not deteriorated. Thus, the present invention provides the fuel cap 1 which is excellent in the sealing stability especially at the end stage of the securing operation while carrying out the sealing property by utilizing the coil spring 25.

Here will be described the turning operation from the early stage of the securing operation of the fuel cap 1 to the end stage of the securing operation. The early stage of the securing operation of the fuel cap 1 is defined as the state in which the engagement protrusions 241 formed on the outer side face of the sliding sleeve 24 and the engagement members 231 of the turning control sleeve 23 are individually fitted between the ridges 32 and 32 formed on the inner side wall of the filler neck 3. At the early stage of the securing operation, the seal ring 22 is not pressed tightly but abuts against the opening edge 31 of the filler neck, as shown in FIG. 3 and FIG. 4. The sliding sleeve 24 is elastically supported by the coil spring 25 with respect to the base 26 spacing from the lower end of the sliding sleeve 24.

Figure 6:
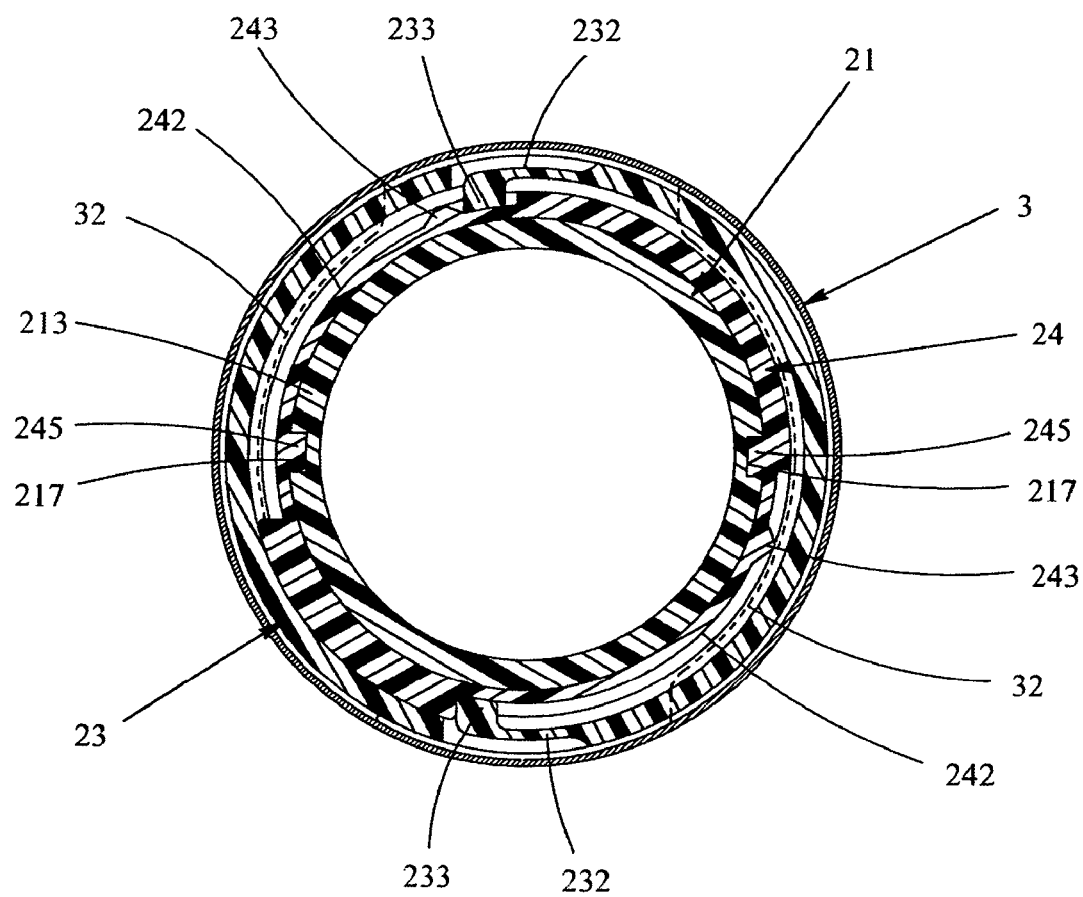
FIG. 6 is a section taken on line B-B in FIG. 3.

In this embodiment, the protrusions 233 owned by the latches 232 of the turning control sleeve 23 are fitted in the guide grooves 242 formed on the inner side face of the sliding sleeve 24, as shown in FIG. 6. The latches 232 and 232 of this embodiment are paired to confront each other in the circumferential direction. In this embodiment, moreover, the bumps 243 and 243 are formed individually to vicinity of the beginning end of the guide groove 242 (as one end located on the left side of FIG. 2 and on the upper side of FIG. 6) and to vicinity of the termination of the guide groove 242 (as other end located on the right side of FIG. 2 and on the lower side of FIG. 6). In this embodiment, sensitivity of the comfortableness obtained by the combination of the latch 232 and the bump 243 is set in relatively low when the protrusion 233 runs over the bump 243 in direction with pulling each latch 232. On the other hand, sensitivity of the comfortableness is set in relatively high when the protrusion 233 runs over the bump 243 in direction with pushing each latch 232. As a result, the bump 243 formed to vicinity of the beginning end of the guide groove provides high comfortableness right after starting the turning operation of the cap in the closing direction from the early step of the securing operation. On the other hand, the bump 243 formed to vicinity of the beginning end of the guide groove provides low comfortableness right before completing the turning operation of the cap in the opening direction from the end step of the securing operation. On the contrary, the bump 243 formed to vicinity of the termination of the guide groove provides low comfortableness right before completing the turning operation of the cap in the closing direction from the step for starting the fastening operation. On the other hand, the bump 243 formed to vicinity of the termination of the guide groove provides high comfortableness right after starting the turning operation of the cap in the opening direction from the end step of the securing operation. That is, the latches 232 and 232 located in confronting relation compensate their own comfortableness thereby to provide the substantially equivalent comfortableness right after starting the turning operation and right before completing the turning operation.

Thus, the fuel cap 1 of this embodiment can perform the turning operation within the predetermined range to move the protrusions 233 of the latches 232 on the guide grooves 242 while providing moderate comfortableness with the mechanism for comfortableness which is led by combination of the protrusions 233 of the latches 232 and the bumps 243 of the guide grooves 242 in the turning operation of the closing direction (i.e., clockwise, as viewed from the top of the cap). In this case, the turning control sleeve 23 is positionally fixed in the turning direction because the engagement members 231 of the turning control sleeve are fitted in intervals formed between the ridges 32 and 32 of the filler neck 3. On the other hand, the sliding sleeve 24 engaging with the closure body 21 and the base 26 fixed on the lower end of the trunk portion 213 can turn and move down integrally except for compressing the coil spring 25. According to this structure of the sleeve, when a slant 246 of the engagement protrusions 241 formed on the outer side face of the sliding sleeve 24 are pressed toward the ridges 32, the sliding sleeve is relatively turned while slipping into the ridges 32. Therefore, an amount of the slipping of the engagement protrusions 241 into the lower face of the ridges 32 becomes equal to an amount of the downward sliding of the sliding sleeve 24.

The sliding sleeve 24 moves downward independently of the base 26 and the closure body 21 till its lower end abuts against the base 26. If the coil spring 25 has an excessively high elastic force, the base 26 is pressed down in response to the every single downward movement of the sliding sleeve 24. This causes rattle of the closure body 21 in that the lower end of the sliding sleeve 24 is still kept in separate from the base 26 even at the end stage of the securing operation. Accordingly, it is necessary to set the elastic force of the coil spring 25 lower than the pressure occurred in slipping the engagement protrusions 241 into the lower face of the ridges 32.

Figure 9:
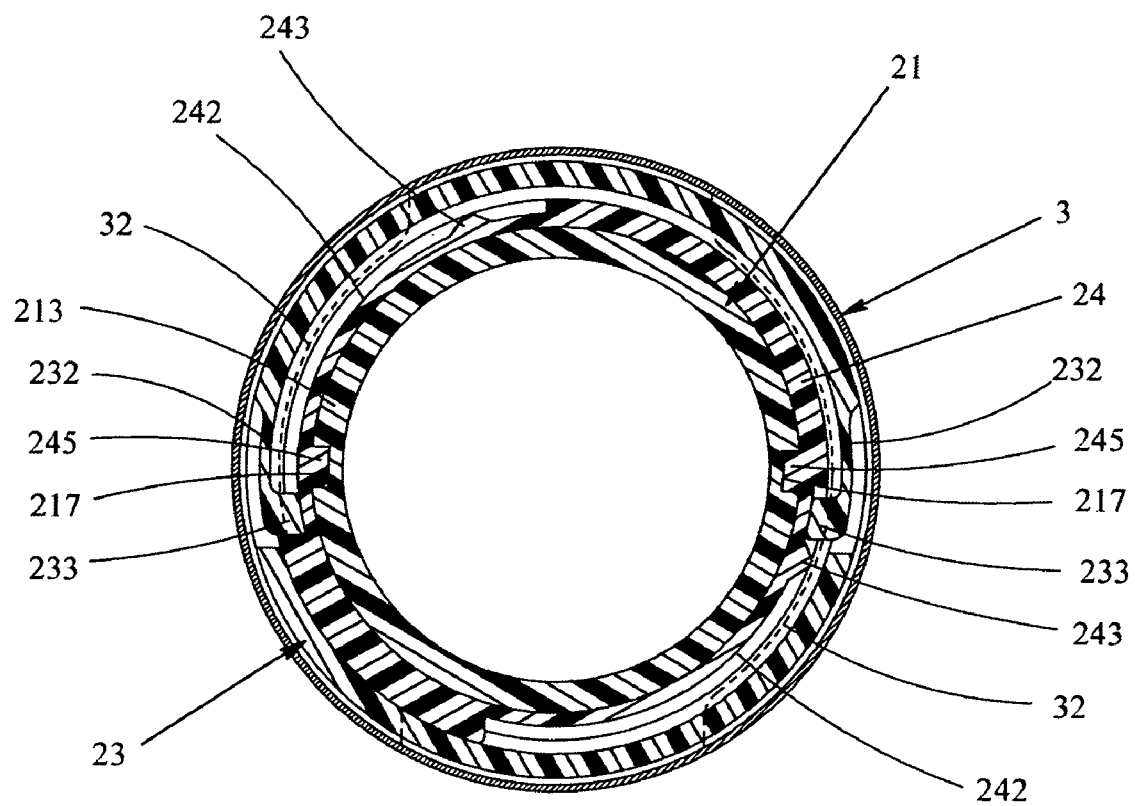
FIG. 9 is a sectional view corresponding to FIG. 5 showing the end stage of the securing operation as mentioned above.

When the sliding sleeve 24 moves downward while compressing the coil spring 25 so that its lower end abuts against the base 26, the base 26 is then pressed to move down together by the lower end of the sliding sleeve 24. Simultaneously, the closure body 21 having the base 26 fixed thereon begins to move down. This downward movement of the closure body 21, as shown in FIG. 7 and FIG. 8, generates to press the seal ring 22 sandwiched between the head portion 211 and the opening edge 31 of the filler neck tightly. When the protrusions 233 of the latches 232 formed on the turning control sleeve 23 thus reached at termination of the guide grooves 242 of the sliding sleeve 24, the turning operation is completed, as shown in FIG. 9. As being obvious from FIG. 7 and FIG. 8, the seal ring 22 is pressed tightly so as to exhibit the sufficient sealing property. Moreover, the lower end of the sliding sleeve 24 abuts against the base 26 at the end stage of securing operation. It is, therefore, found that the sealing property is kept in stable without fears of rattling of the entire closure unit 2.

The fuel cap 1 of this embodiment exhibits the predetermined sealing property so long as the engagement protrusions 241 of the sliding sleeve 24 are sliding into the lower face and engaging with the ridges 32 of the filler neck 3. This means that the sealing property is not deteriorated so long as the engagement protrusions 241 are engaging with the ridges 32, even if the closure unit 2 is turned by external force such as the collision with the automobile. Thus, the fuel cap 1 of the present invention can achieve not only improvements of the operability to complete the securing operation within a narrow turning range together with the stable sealing property but also realization of a necessary and sufficient fail-safe structure. The description of the turning operation of the present fuel cap 1 in the opening direction is omitted, because the turning operation in the opening direction can be basically described as the reverse of the turning operation in the closing direction.

We claim:

1. A fuel cap comprising a closure unit adapted to be fitted into an opening of a filler neck, the filler neck having a plurality of ridges formed on its inner side face intermittently in the circumferential direction, so that it may be secured to the filler neck by engaging with the ridges during a turning operation, wherein the closure unit includes a closure body, a seal ring, a sleeve, a base and an elastic member, the closure body includes a trunk portion projecting from a head portion to be turned and having a plurality of closure side fitting portions on its outer side face, the sleeve is provided on its inner side face with a plurality of sleeve side fitting portions and an elastic member fitting portion and on its outer side face with a plurality of engagement protrusions adapted to be passed axially through corresponding intervals formed between the ridges of the filler neck and then turned for engaging with the upper surface of the ridges, the sleeve can be freely slid upward and downward with respect to the trunk portion of the closure body while being fitted together with the seal ring on the trunk portion and can be freely turned integrally with the closure body by fitting the closure side fitting portion and the sleeve side fitting portion together, a spacing is formed between a lower end of the sleeve and the lowermost upper surface of the base positioning right below the sleeve by fixing the base to a lower end of the trunk portion with the sleeve fitted thereon while internally sandwiching the elastic member between the elastic member fitting portion of the sleeve and the base, and the spacing is set smaller than an amount of the downward sliding of the sleeve which is caused when the engagement protrusions, formed on the outer side face of the sleeve, slip into lower faces of the ridges formed on the inner side face of the filler neck, the lower end of the sliding sleeve is lowered and comes into abutment against the base on halfway of its downward movement and the closure body integrated with the base is pushed further downward so that the seal ring is sandwiched and pressed tightly between the head portion of the closure body and the opening edge of the filler neck.

2. A fuel cap according to claim 1, wherein
the closure body includes a ring mounting portion formed at root of the trunk portion with respect to the head portion, and
the seal ring mounted on the ring mounting portion is pressed tightly by the head portion and an opening edge of the filler neck.

3. A fuel cap according to claim 1, wherein the seal ring is formed into an annular shape having a C-shaped section so as to be pressed tightly by edges of an upper circumferential portion thereof coming into facial contact with the head portion of the closure body and a lower circumferential portion thereof coming into contact with the opening edge of the filler neck.

4. A fuel cap according to claim 1, wherein
the sleeve includes a sliding sleeve and a turning control sleeve fitted on the sliding sleeve,
an inner side face of the sliding sleeve is provided with the sleeve side fitting portions and the elastic member fitting portion,
an outer side face of said sliding sleeve is provided with the engagement protrusions adapted to be passed axially through the corresponding intervals formed between the ridges of the filler neck and then turned for engaging upward with the ridges,
the outer side face is further provided with a plurality of guide grooves extending in the circumferential direction,
the turning control sleeve includes a plurality of engagement members projecting therefrom and adapted to be engaged while being fitted to corresponding intervals formed between the ridges of the filler neck with a plurality of engagement protruding parts protruding in a radially inward direction formed on its inner side face, and
the guide grooves limit the range in which the engagement protruding parts are allowed to move in the circumferential direction, thereby to control the turning amount of the closure unit in the turning operation.

5. A fuel cap according to claim 1, wherein
the sleeve includes a sliding sleeve and a turning control sleeve fitted on the sliding sleeve,
an inner side face of the sliding sleeve is provided with the sleeve side fitting portions and the elastic member fitting portion,
an outer side face of said sliding sleeve is provided with the engagement protrusions adapted to be passed axially through the corresponding intervals formed between the ridges of the filler neck and then turned for engaging upward with the ridges,
said outer side face is further provided with a plurality of engagement protruding parts protruding in a radially outward direction,
the turning control sleeve includes the engagement members projecting therefrom and adapted to be engaged while being fitted to corresponding intervals formed between the ridges of the filler neck with a plurality of guide grooves extending in the circumferential direction formed on its inner side face, and
the guide grooves limit the range in which the engagement protruding parts are allowed to move in the circumferential direction, thereby to control the turning amount of the closure unit in the turning operation.

6. A fuel cap according to claim 1, wherein
the sleeve includes a sliding sleeve and a turning control sleeve fitted on the sliding sleeve,
the sliding sleeve comprises an inner side face provided with the sleeve side fitting portions and the elastic member fitting portion, an outer side face provided with the engagement protrusions adapted to be passed axially through the corresponding intervals formed between the ridges of the filler neck and then turned for engaging upward with the ridges, and a plurality of guide grooves extending in the circumferential direction further provided on said outer side face,
the turning control sleeve includes the engagement members projecting therefrom and adapted to be engaged while being fitted to corresponding intervals formed between the ridges of the filler neck with a plurality of latches having protrusions protruding in a radially inward direction formed on its inner side face,
the guide grooves include bumps formed in the vicinity of at least one end of the guide groove and limit the range in which the protrusions of the latches are allowed to move in the circumferential direction, thereby to control the turning amount of the closure unit in the turning operation and,
the protrusions of the latches further provide comfortableness of the turning operation in which the protrusions run over the bumps of the guide grooves in the turning operation of the closure unit.

7. A fuel cap according to claim 1, wherein
the sleeve includes a sliding sleeve and a turning control sleeve fitted on the sliding sleeve,
the sliding sleeve comprises an inner side face provided with the sleeve side fitting portions and the elastic member fitting portion, an outer side face provided with the engagement protrusions adapted to be passed axially through the corresponding intervals formed between the ridges of the filler neck and then turned for engaging upward with the ridges, and a plurality of latches having protrusions protruding in a radially outward direction further provided on said outer side face,
the turning control sleeve includes the engagement members projecting therefrom and adapted to be engaged while being fitted to corresponding intervals formed between the ridges of the filler neck with a plurality of guide grooves extending in the circumferential direction on its inner side face, the guide grooves include bumps formed in the vicinity of at least one end of the guide groove and limit the range in which the protrusions of the latches are allowed to move in the circumferential direction, thereby to control the turning amount of the closure unit in the turning operation and, the protrusions of the latches further provide comfortableness of the turning operation in which the protrusions run over the bumps of the guide grooves in the turning operation of the closure unit.

8. A fuel cap according to claim 1, wherein the elastic member is a coil spring mounted loosely on the trunk portion of said closure body.

* * * * *